United States Patent
Kang et al.

(10) Patent No.: US 10,077,768 B2
(45) Date of Patent: Sep. 18, 2018

(54) PLANAR COIL AND SUPPORT FOR ACTUATOR OF FLUID MOVER

(71) Applicant: Aavid Thermalloy, LLC, Laconia, NH (US)

(72) Inventors: Sukhvinder S. Kang, Concord, NH (US); Timothy Swain Lucas, Richmond, VA (US)

(73) Assignee: Aavid Thermalloy, LLC, Laconia, NH (US)

( * ) Notice: Subject to any disclaimer, the term of this patent is extended or adjusted under 35 U.S.C. 154(b) by 357 days.

(21) Appl. No.: 14/697,971

(22) Filed: Apr. 28, 2015

(65) Prior Publication Data

US 2015/0316046 A1    Nov. 5, 2015

Related U.S. Application Data (60) Provisional application No. 61/988,429, filed on May 5, 2014.

(51) Int. Cl.
  *F04B 45/047*   (2006.01)
  *H02K 33/16*    (2006.01)
  (Continued)

(52) U.S. Cl.
  CPC .......... *F04B 45/043* (2013.01); *F04B 43/046* (2013.01); *F04B 45/047* (2013.01); *H02K 33/16* (2013.01)

(58) Field of Classification Search
  CPC ...... F04B 45/043; F04B 45/04; F04B 43/025; F04B 43/04; F04B 35/045; F04B 17/04;
  (Continued)

(56) References Cited

U.S. PATENT DOCUMENTS 4,231,287 A    11/1980   Smiley
4,830,577 A  *  5/1989   Moffatt ................... F04B 43/04
                                                417/413.1
(Continued)

FOREIGN PATENT DOCUMENTS

JP        04094479 A   *  3/1992
WO     WO 2007103384 A2    9/2007
WO     WO 2012048179 A2    4/2012

OTHER PUBLICATIONS

English Abstract of JP 04094479A dated Mar. 26, 1992.*
(Continued)

*Primary Examiner* — Nathan Zollinger
(74) *Attorney, Agent, or Firm* — Wolf, Greenfield & Sacks, P.C.

(57) ABSTRACT

A fluid mover includes a chamber with one or more outlet openings, first and/or second fluidic diaphragm(s) having a portion movable in the chamber to cause fluid to move at the outlet opening, and a coil assembly magnetically coupled to the fluidic diaphragm to move the movable portion of the fluidic diaphragm(s) in response to a current in the coil. The coil assembly includes a coil with an opening, and a plug may be positioned in the opening and/or a support may be positioned around a periphery of the coil. The plug and/or the support may have a magnetic permeability greater than one and be arranged so magnetic field lines created by the coil pass through the plug and/or support. The coil, plug and/or support may define a flat surface, e.g., such that a uniform gap is present between the diaphragm(s) and the coil, plug and/or support.

24 Claims, 5 Drawing Sheets

(51) Int. Cl.
*F04B 45/04* (2006.01)
*F04B 43/04* (2006.01)

(58) Field of Classification Search
CPC ........ H02K 33/00; H02K 33/02; H02K 33/06; H02K 33/16; H02K 37/08
USPC ..................................................... 417/413.1
See application file for complete search history.

(56) References Cited

U.S. PATENT DOCUMENTS

| | | | | |
|---|---|---|---|---|
| 5,607,292 | A | * | 3/1997 | Rao ...................... F04B 17/044 417/410.1 |
| 6,116,863 | A | * | 9/2000 | Ahn ...................... F04B 43/043 417/322 |
| 8,272,851 | B2 | | 9/2012 | Lucas |
| 8,446,236 | B2 | * | 5/2013 | McGuire .............. H01H 50/043 335/205 |
| 8,974,200 | B2 | * | 3/2015 | Chan ................... F04B 43/0054 138/39 |
| 2008/0240942 | A1 | * | 10/2008 | Heinrich ............... F04B 43/023 417/322 |
| 2013/0236337 | A1 | * | 9/2013 | Gummin ............... F04B 43/043 417/412 |
| 2014/0252120 | A1 | | 9/2014 | Lucas et al. |

OTHER PUBLICATIONS

International Search Report and Written Opinion dated Oct. 7, 2015 from corresponding International Application No. PCT/US2015/027969.

* cited by examiner

PLANAR COIL AND SUPPORT FOR ACTUATOR OF FLUID MOVER

CROSS REFERENCE TO RELATED APPLICATION

This application claims the benefit of U.S. Provisional Application No. 61/988,429, filed May 5, 2014, which is hereby incorporated by reference in its entirety.

BACKGROUND OF THE INVENTION

1) Field of Invention

This invention relates generally to the pumping of fluids in positive displacement pumping devices, otherwise known as fluid movers, such as liquid pumps, gas compressors and synthetic jets and in general to the transfer of energy to fluids.

2) Description of Related Art

When compared to rotary, piston, centrifugal and other pumping approaches, diaphragms provide a lower profile means for creating a cyclic positive displacement for small fluid movers such as pumps, compressors and synthetic jets. One type of diaphragm-type fluid mover, i.e., synthetic jet devices, can provide significant energy savings when used for cooling high power density and high power dissipation electronics products such as for example servers, computers, routers, laptops, HBLEDs and military electronics. U.S. Pat. No. 8,272,851 and PCT application WO2012/048179 describe various arrangements for synthetic jet systems and other fluid mover systems, and are both hereby incorporated by reference in their entirety.

SUMMARY OF THE INVENTION

However, the functional chamber of a synthetic jet device is typically quite small because the entire device must be sized to fit within a space-constrained product, such as a laptop computer, and these space constraints have driven complexities in design that prevent the synthetic jet device from operating in an optimal matter. For example, the functional chamber (where fluid is moved within the device to cause desired fluid movement outside of the device) usually has an irregular shape or configuration which can cause resistance to flow in the chamber. This resistance to flow can reduce the pumping power density because the device must do more work to overcome flow pressure drops due to turbulence, flow restrictions and/or other resistance to flow in the chamber. The design complexities also result in other functional disadvantages, such as increasing an overall height of the device, introducing complexities in device manufacturing and assembly, and others.

As an example, the complex topology of one synthetic jet actuator includes an actuator coil arranged to receive at least a portion of a diaphragm or an associated armature into a space within a central opening of the coil. That is, the actuator coil is arranged to have an annular shape with a central opening, and the coil and diaphragm are configured such that a portion of the diaphragm or associated armature is received into the opening of the coil as the diaphragm moves relative to the coil. This arrangement may not be optimal for a variety of reasons, such as providing an irregular and complex flow path for fluid in an area where the diaphragm portion is received into the coil opening, reducing an effective pumping area of the diaphragm (e.g., those portions of the diaphragm that move inside the coil opening may not be as effective in moving fluid), requiring complex armature shapes or other configurations, increasing an overall height of the diaphragm/coil structure, and others.

Aspects of the invention provide for a fluid mover with a significantly simplified and low profile coil assembly and/or diaphragm. For example, the coil assembly may be arranged to define a flat, generally planar structure with a simple construction, relatively low overall height, improved magnetic performance (e.g., reduced reluctance) and/or enhanced flow performance. In one arrangement, the coil assembly may include an actuator coil having an annular shape and a central opening. The coil may be supported in a fluid mover chamber by a coil support that surrounds the perimeter of the coil, and the central opening of the coil may be at least partially occluded or filled by a plug. That is, the support and/or plug may fill, at least partially or completely, the area around the perimeter of the coil and/or the central opening of the coil in the plane of the coil. Thus, in some arrangements, the coil and coil support/plug may define a generally flat, planar structure, which is highly simplified in comparison to prior coil and support configurations. In some embodiments, the plug and/or support may have high magnetic permeability, i.e., include a material with a relative magnetic permeability of greater than one, and therefore act as part of the flux circuit loop to thereby increase the actuator force by reducing total reluctance of the flux loop. This is in contrast to some prior systems in which areas around the coil and/or in the central opening of the coil include no relatively low reluctance material and instead include only, or mainly, air-filled space. In some cases, the coil and plug and/or support may define a flat surface adjacent a diaphragm, which may itself present a flat surface to the coil assembly. This may allow the plug and/or support to be closely positioned to the diaphragm and/or armature in order to reduce the nominal air gap between the diaphragm and/or armature, thereby increasing the magnetic forces created in the air gap resulting from a given coil current. In some cases, the diaphragm armature and coil assembly may be arranged such that no portion of the armature or other part of the diaphragm is received beyond a nearest surface of the coil during movement of the diaphragm. Instead, all portions of the diaphragm (and any associated armature) may remain outside of a plane that includes the coil's nearest surface to the diaphragm.

Some aspects of the invention may also provide a flow path over a coil assembly that has reduced resistance to flow. For example, a coil assembly, or portions thereof, may be arranged with one or more bounding walls that are generally flat, and thus permit smooth flow over the wall(s). For example, a chamber in a fluid mover may be defined on one side by a coil assembly (e.g., including a coil and plug and/or support), and on an opposed side by a movable diaphragm. As is known to those of skill in the art, the coil may be controlled to create a magnetic field which attracts a part of the diaphragm toward the coil. This movement of the diaphragm changes a volume of the chamber (or a portion thereof) in a space or gap between the coil/plug/support and the diaphragm, causing flow in the chamber. In some embodiments, the coil assembly and/or the diaphragm may each define a flat surface that at least partially bounds the chamber and permits smooth flow in the chamber, e.g., in contrast to arrangements where the coil assembly is configured to have an irregular surface that at least partially defines the chamber. In one embodiment, the coil may be supported by a coil support around the coil, and the coil may be arranged in an annular ring shape which has an opening that is at least partially filled by a plug. A surface of the coil opposed to the diaphragm may be flush with a surface of the plug and/or the coil support such that the coil assembly defines a flat surface opposed to the diaphragm. The diaphragm too may have a flat surface which is opposed to the coil assembly, thus defining the chamber in part with two, opposed flat surfaces between which flow in the chamber may occur based on movement of the diaphragm.

In one aspect of the invention, a fluid mover includes a chamber having an outlet opening, and a first fluidic diaphragm having a portion movable in the chamber to cause fluid to move at the outlet opening. A coil assembly in the chamber may be positioned adjacent the first fluidic diaphragm and magnetically coupled to the fluidic diaphragm to move the movable portion of the fluidic diaphragm in the chamber in response to a current in the coil. That is, a time-varying current in the coil may cause the fluidic diaphragm to vibrate in the chamber, causing fluid movement at the outlet opening. The coil assembly may include a coil with an annular shape and an opening inside the annular shape, e.g., the coil may be arranged as a circular or oval ring with a center opening. The coil assembly may also include at least one of a plug in the opening, e.g., to partially or completely occlude or fill the opening, or a support around a periphery of the coil to support the coil in the chamber. The plug and/or the support may include a material with a relative magnetic permeability greater than one and be arranged such that magnetic field lines created by a current in the coil to cause movement of the fluidic diaphragm pass through the plug and/or support. With this arrangement, the plug and/or support may increase the magnetic forces applied to the diaphragm for a given coil current, e.g., by reducing the air gap reluctance of the magnetic flux loop including the diaphragm and/or armature. The plug and/or support may also function as a physical barrier or wall between the diaphragm and another portion of the fluid mover on an opposite side of the coil assembly, such as a second diaphragm. The barrier or wall provided may reduce the resistance to fluid flow in the chamber as well as improve the magnetic performance of the system.

In some arrangements, the first fluidic diaphragm and the coil assembly may be arranged such that no portion of the fluidic diaphragm enters the opening of the coil during movement of the fluidic diaphragm, e.g., no part of the diaphragm may pass through a plane that includes a portion of the coil positioned nearest the diaphragm. Thus, the diaphragm may be positioned very close to the coil assembly, but not move within a space defined by the coil. In some cases, plug may completely occlude the opening of the coil, e.g., so fluid cannot move through the opening. Similarly, the support may be immediately adjacent the periphery of the coil around the hole in which the coil is positioned such that fluid cannot pass through any gap or opening between the coil and the support. The coil and support and/or plug may define a flat structure, e.g., a generally planar structure in which the support, coil and/or plug all have approximately a same thickness. In some cases, the coil assembly including support, coil and plug may define a structure with a thickness to width ratio of about 0.005 to about 0.1. In some cases, the diaphragm may include an armature with a similarly flat structure, e.g., formed as a flat plate of material with a relative magnetic permeability greater than one and a thickness to width ratio of about 0.002 to 0.1.

In some embodiments, two diaphragms may be provided with the fluid mover, e.g., a first fluidic diaphragm may be positioned over a top of the coil assembly, and a second fluidic diaphragm positioned under a bottom of the coil. The support, coil and/or plug may define a first flat surface opposed to the first fluidic diaphragm, and a second flat surface opposed to the second fluidic diaphragm. The diaphragms may be caused to move toward each other based on a current in windings of the coil. That is, upper and lower gaps may be present between the first fluidic diaphragm and the coil assembly, and between the second fluidic diaphragm and the coil assembly, respectively, and the fluid mover may be arranged to move fluid in the upper and lower gaps based on movement of the first and second fluidic diaphragms relative to the housing.

Aspects of the invention may also provide for a chamber defined between a coil and plug or coil support on one side and a movable diaphragm on the other which has a uniform gap thickness or distance between the coil/plug/support and the diaphragm. By providing a uniform gap thickness for the chamber, flow in the chamber may be less restricted, e.g., because of reduced turbulence, restriction to flow, or other characteristics which resist flow in the chamber. The uniform gap thickness may be provided by arranging the coil/plug/support and the diaphragm to have opposed, planar surfaces that are uniformly spaced from each other, or in other ways, e.g., by having the coil/plug/support and diaphragm have complementary shaped surfaces (such as conical, spherical, etc.) that have a uniform distance between the surfaces.

In some embodiments, the chamber may include two sections or gaps arranged on opposite sides of a coil/plug/support, and the coil/plug/support may define a low resistance flow surface on both of its sides. Diaphragms may be arranged on opposite sides of the coil/plug/support so that control of the coil may cause both of the diaphragms to move, thereby causing flow in the chamber sections or gaps on both sides of the coil/plug/support. Consistent with the embodiments described above, the coil/plug/support may define a flat surface which is opposed to a flat surface of the two diaphragms. Other configurations are possible as well, such as providing a uniform gap thickness in the chamber sections on one or both sides of the coil/plug/support, providing a surface of the coil to be flush with a surface of a support plate on one or both sides of the coil, providing a flat coil/plug surface on one or both sides of the coil/plug, etc. This configuration of diaphragms arranged on opposed sides of a coil can provide a highly efficient actuator, e.g., because movement of the diaphragms can be controlled to reduce vibration and to exploit one or more mechanical resonant frequencies of the system. However, aspects of the invention can be used with single-diaphragm fluid movers.

Some aspects of the invention provide for a coil assembly configuration that provides a physical barrier or separation between two, opposed fluidic diaphragms. The barrier or separation wall may be made of, or otherwise include, a highly magnetically permeable material which enhances a magnetic force that may be applied by current in the coil assembly on the fluidic diaphragms. This is in contrast to systems that have opposed fluidic diaphragms and a coil assembly between the diaphragms, but have only a single air gap that separates at least portions of the diaphragms from each other. However, by providing a high magnetic permeability separation wall between at least portions of the diaphragms, e.g., at a central opening of an actuator coil and/or around a periphery of the coil, magnetic attractive forces on the diaphragms may be enhanced and may be nearly equal despite the introduction of two independently oscillating air gaps in the magnetic flux circuit. For example, in one embodiment, a coil assembly may include a coil formed as an annular ring that is supported between a pair of fluidic diaphragms. In contrast to prior systems, an opening inside of the coil may be occluded or otherwise at least partially filled by a central plug or plate. The central plug may be made of a magnetically permeable material such that attractive forces on the diaphragms created by a current in the coil may be enhanced, e.g., strengthened in comparison to an arrangement in which the central plug is absent. Alternately, or in addition, a support around the periphery of the coil may be made of a magnetically permeable material, e.g., with a relative magnetic permeability of greater than one. Such an arrangement may also assist in generating nearly equal forces on the diaphragms despite the introduction of two independently oscillating air gaps in the magnetic flux circuit, which may help reduce vibration of the fluid mover housing because the diaphragms experience relatively equal, and opposite, forces that cause the diaphragms to move in the chamber with nearly equal and opposite motion, e.g., nearly the same displacement, velocity and acceleration characteristics.

In one aspect of the invention, a fluid mover includes a chamber having an outlet opening, e.g., a housing may define the chamber and may include one or more openings to the chamber through which fluid may flow. First and second fluidic diaphragms in the chamber may each have a portion that is movable in the chamber to cause fluid to move at the outlet opening. For example, the diaphragms may be caused to oscillate in the chamber in such a way as to cause fluid to move into and out of the outlet opening. A coil assembly in the chamber may be positioned between the first and second fluidic diaphragms and coupled to the fluidic diaphragms to move the movable portions of the fluidic diaphragms in the chamber. For example, a current in the coil assembly may generate a magnetic field that causes a portion of the diaphragms to move toward the coil assembly. In one embodiment, the coil assembly may include a coil with an annular shape and an opening inside the annular shape, and a center plug may at least partially occlude or fill the opening of the coil. That is, the center plug may act as a barrier or separation wall between the first and second diaphragms. In arrangements where the center plug is made of a magnetically permeable material, the center plug may enhance a strength of attractive forces on the diaphragms that is generated by current in the coil. That is, the center plug acts as part of the flux circuit loop thereby increasing actuator force by reducing total reluctance of the flux loop.

In some embodiments, a support may be arranged around the coil to support the coil in the chamber. Moreover, the support, the coil and the center plug may together define a flat structure, e.g., that includes first and second flat surfaces opposed to the first and second fluidic diaphragms, respectively. These flat surfaces may provide a reduced resistance to flow, as described above, without causing unequal forces on the diaphragms despite the introduction of two independently oscillating air gaps in the flux loop. In one embodiment, the support is formed as a flat plate with a hole in which the coil is positioned, and a first upper surface of the coil may be located in a same plane as a second upper surface of the support, and a second lower surface of the coil may be located in a same plane as a second lower surface of the support. Similarly, upper and lower surfaces of the central plug may lie in a same plane as upper and lower surfaces of the coil, e.g., the central plug may be made as a flat plate having a same thickness as the coil and the coil support. In another embodiment, the coil support is made of high permeability magnetic material such that the support acts as part of the flux circuit loop thereby increasing actuator force by reducing total reluctance.

In some embodiments, the first and second diaphragms each include first and second armatures, respectively, positioned on a side of the first and second diaphragms adjacent the coil and center plug. These armatures may each define a flat surface that is opposed to the coil and center plug. Thus, the armatures and the support/coil/center plug may define flat surfaces that are opposed to each other. Upper and lower gaps may be present between the first armature and the support, coil and center plug, and between the second armature and the support, coil, and center plug, respectively, and movement of the armatures may cause fluid to move in the upper and lower gaps, and thereby cause movement of fluid at the outlet opening. The upper and lower gaps, which may have a uniform thickness across the armatures, may be in fluid communication with each other, e.g., via holes in the coil support or center plug, which may help in maintaining a relatively equal dynamic pressure on the diaphragms.

In another aspect of the invention, a fluid mover may include a chamber having an outlet opening, and a fluidic diaphragm having a portion movable in the chamber to cause fluid to move at the outlet opening. A coil assembly in the chamber may be coupled to the fluidic diaphragm to move the portion of the fluidic diaphragm in the chamber, and may include a coil arranged as an annular body with an opening. A plug in the opening of the coil may completely, substantially or at least partially occlude or fill the opening. In some embodiments, the plug may have a first surface that is opposed to the diaphragm, and the first surface may be flush with, or lie in a same plane as, a surface of the coil that is opposed to or nearest the diaphragm. In still yet other embodiments, a support around the coil that supports the coil in the chamber may together with the coil and/or the plug define a flat surface which is opposed to the fluidic diaphragm. For example, the support may be formed as a flat plate having a hole in which the coil is positioned, and an upper surface of the coil may be located in a same plane as an upper surface of the support.

In some embodiments, the fluid mover may include two diaphragms, e.g., a first fluidic diaphragm positioned over a top of the coil, and a second fluidic diaphragm positioned under a bottom of the coil. The support, coil and/or plug may define a first flat surface that is opposed to the first diaphragm, and a second flat surface opposed to the second fluidic diaphragm. Upper and lower gaps may be present between the first fluidic diaphragm and the coil and between the second fluidic diaphragm and the coil, respectively, and the fluid mover may be arranged to move fluid in the upper and lower gaps based on movement of the first and second fluidic diaphragms relative to the housing. For example, the support and coil may be arranged to remain stationary relative to the chamber, and a current in the coil may cause the first and second diaphragms to move relative to the chamber, e.g., in vibratory movement in the chamber at a frequency of 0.1 Hz to 1 kHz or more or alternatively in single pulses that occur at non-periodic intervals. In some embodiments, the fluid diaphragm(s) have a periphery which is fixed relative to the chamber, and the coil assembly is arranged to move portions of the fluidic diaphragm located inward of the periphery relative to the chamber.

These and other aspects of the invention will be apparent from the following description.

BRIEF DESCRIPTION OF THE DRAWINGS

The accompanying drawings, which are incorporated in and form a part of the specification, illustrate select embodiments of the present invention and, together with the description, serve to explain the principles of the inventions. In the drawings.

DETAILED DESCRIPTION

Aspects of the invention are not limited in application to the details of construction and the arrangement of components set forth in the following description or illustrated in the drawings. Other embodiments may be employed and aspects of the invention may be practiced or be carried out in various ways. Also, aspects of the invention may be used alone or in any suitable combination with each other. Thus, the phraseology and terminology used herein is for the purpose of description and should not be regarded as limiting.

Figure 1:
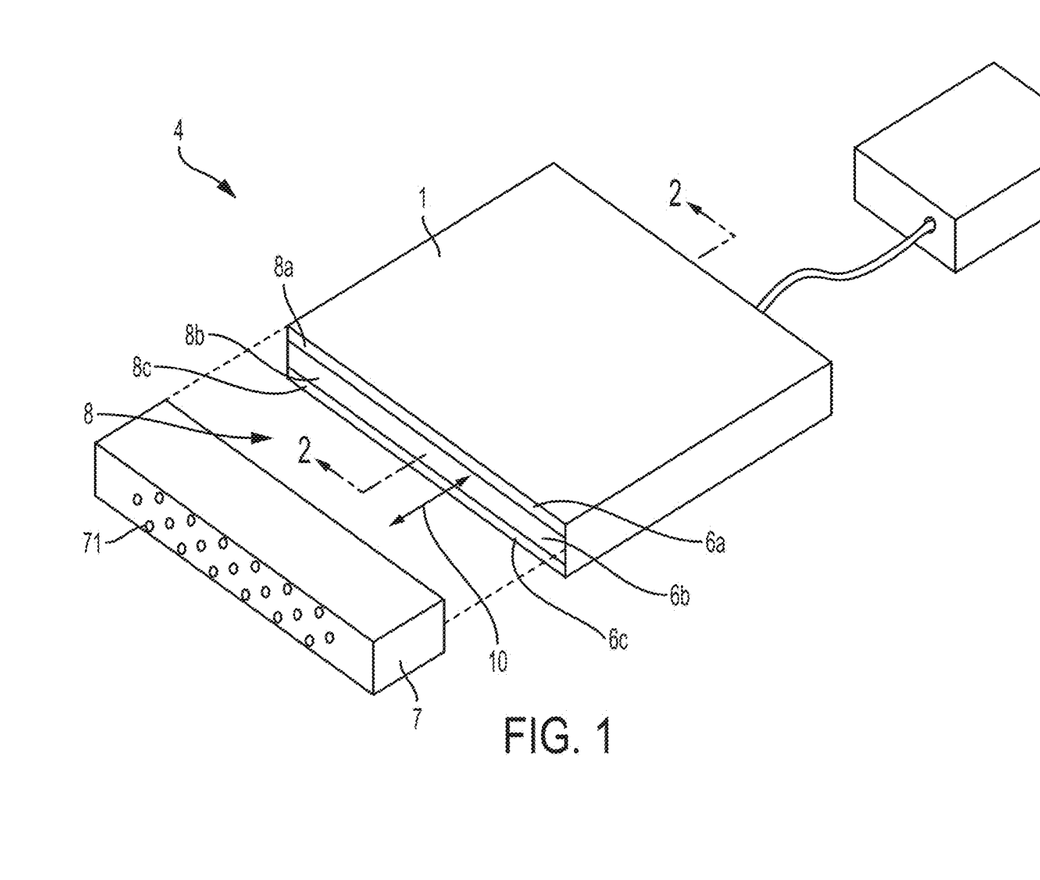
FIG. 1 shows a perspective view of a fluid mover in an illustrative embodiment.
Figure 2:
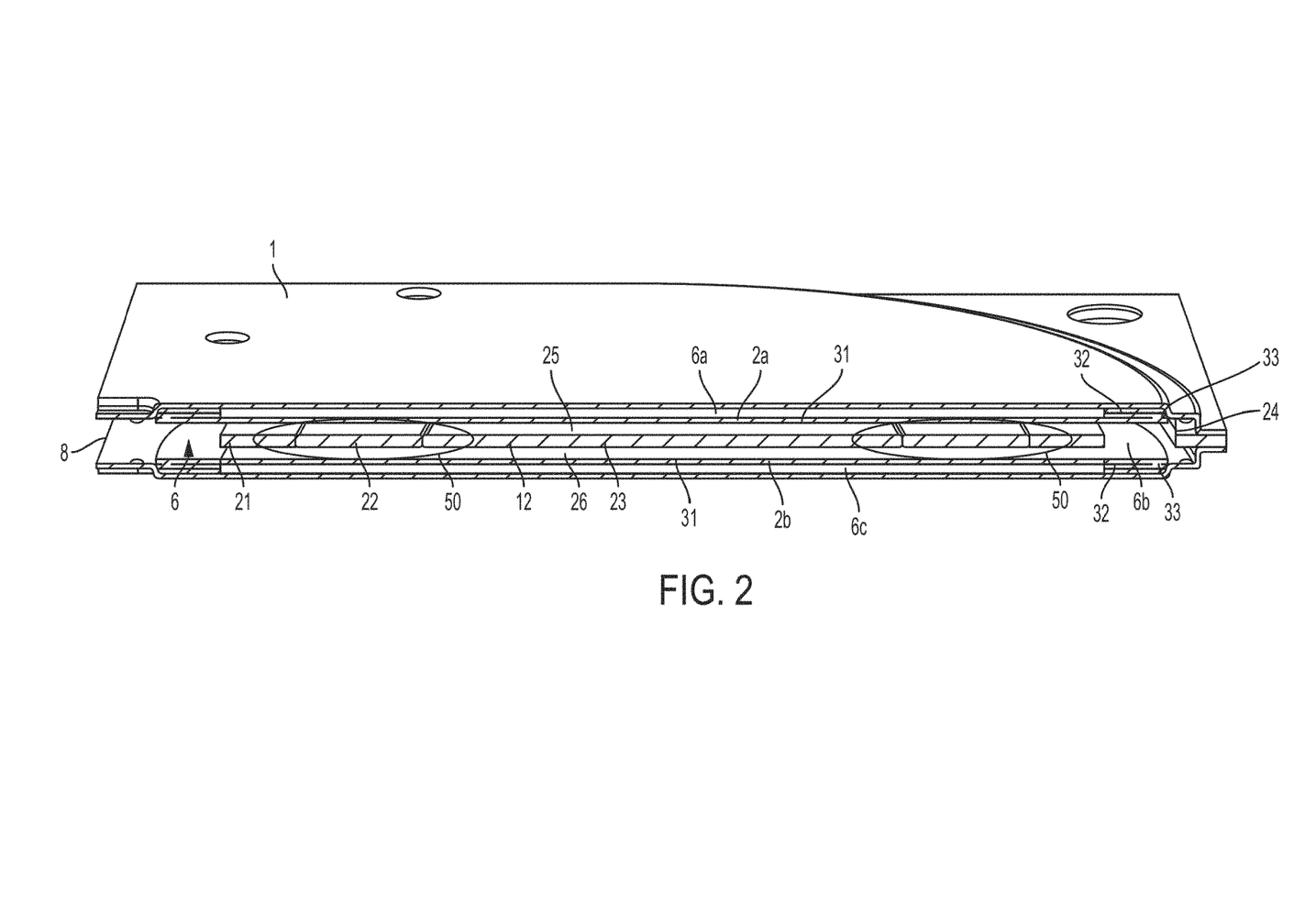
FIG. 2 shows a sectional view of the fluid mover along the line 2-2 in FIG. 1.
Figure 5:
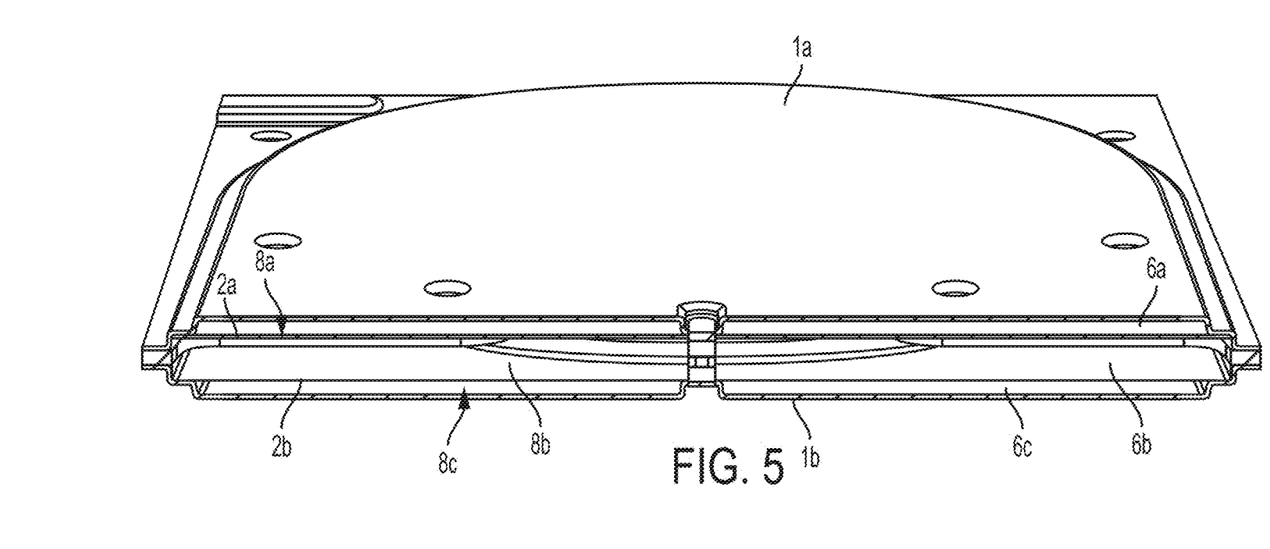
FIG. 5 shows a perspective side view of the fluid mover without a nozzle in place.

FIGS. 1 and 2 show a perspective, schematic view and a sectional view of a fluid mover 4, respectively, in an illustrative embodiment that includes a housing 1 that defines a chamber 6 having an internal volume in which first and second diaphragms 2a, 2b and a coil assembly 12 are located. In this embodiment, the internal volume of the chamber 6 is divided into three main sections: a first outer chamber 6a located above the first diaphragm 2a, a central chamber 6b located between the first and second diaphragms 2a, 2b, and a second outer chamber 6c located below the second diaphragm 2b. As discussed more below, the central chamber 6b is divided into first and second gaps 25, 26 by the coil assembly 12. The first and second outer chambers 6a, 6c and the central chamber 6b are isolated from each other in the chamber 6 by the diaphragms 2, and communicate with an outlet opening 8 located at one side of the chamber 6, as can be seen more clearly in FIG. 5. In this embodiment, each of the first and second outer chambers 6a, 6b and the central chamber 6b communicate with separate sections of the outlet, i.e., 8a, 8c and 8b, respectively The outlet opening 8 may be located in other places, such as at a top or bottom of the chamber 6, if desired, and in some embodiments such as liquid pumps and gas compressors, two or more openings 8 may be provided and these openings may also include valves to enable fluid compression and/or one-directional flow.

As is described in more detail below, the diaphragms 2a, 2b are controllable to move cyclically in the chamber 6 so that air or other fluid is alternately drawn into the first and second outer chambers 6a, 6c and the central chamber 6b at the respective opening sections 8a, 8b, 8c and then driven out of the opening section 8a, 8b, 8c in the direction of an arrow 10. As is known to those of skill in the art and described in more detail in U.S. Pat. No. 8,272,851, this air movement at the outlet opening 8 can cause the formation of a series of air pulses and vortices that move away from the opening 8 in the direction of the arrow 10 so that a synthetic jet is created. In this embodiment, the fluid mover 4 includes an outlet nozzle or manifold 7 that is mated to the housing 1 at the outlet opening 8. The outlet nozzle 7 can be arranged to control a flow rate, direction of flow, location of flow and/or other characteristics of flow from the fluid mover 4. For example, in this embodiment, the outlet nozzle 7 includes three rows of openings 71 that are arranged to direct flow from each of the outlet opening sections 8a, 8b, 8c, respectively. That is, each row of nozzle openings 71 corresponds to a respective outlet section 8a, 8b, 8c and respective chamber section 6a, 6b, 6c, and each row of nozzle openings 71 is arranged to form a plurality of synthetic jets, with each jet being formed by a respective opening 71. It should be appreciated, however, that other arrangements for the outlet nozzle or manifold 7 are possible, such as routing flow in other directions or into one or more air flow ducts, using various port geometries such as a single slotted port instead of a row of round port openings, and so on.

In this embodiment, the coil assembly 12 includes a support 21, a coil 22 and a plug 23. The support 21 is arranged to support the coil 22 and the plug 23 in the chamber 6, e.g., such that the support 21, coil 22 and plug 23 remain stationary relative to the housing 1. The coil 22 is magnetically coupled to the diaphragms 2a, 2b so that a current in the coil 22 can cause movement of a portion of the diaphragms 2a, 2b. That is, a current in the coil 22 may create a magnetic field that generates an attractive force on the diaphragms 2a, 2b that causes the diaphragms 2a, 2b to move toward the coil assembly 12. This movement of the diaphragms 2a, 2b causes flow to occur in the first and second outer chambers 6a, 6c and the central chamber 6b (by adjusting a volume of the chambers 6a-6c), and correspondingly at the outlet opening sections 8a, 8b, 8c.

Operation of the coil assembly 12 may be controlled by a controller 14 (e.g., including a suitably programmed general purpose computer or other data processing device) that receives control information (e.g., from one or more sensors, user input devices, etc.) and correspondingly controls operation of the coil assembly 12 and/or other fluid mover components. The controller 14 may include any suitable components to perform desired control, communication and/or other functions. For example, the controller 14 may include control circuitry such as one or more general purpose computers, a network of computers, one or more microprocessors or PICs, etc., for performing data processing functions, one or more memories for storing data and/or operating instructions (e.g., including volatile and/or non-volatile memories such as optical disks and disk drives, semiconductor memory, magnetic tape or disk memories, and so on), communication buses or other communication devices for wired or wireless communication (e.g., including various wires, switches, connectors, Ethernet communication devices, WLAN communication devices, and so on), software or other computer-executable instructions (e.g., including instructions for carrying out functions related to controlling the fluid mover 4, and other components), a power supply or other power source (such as a plug for mating with an electrical outlet, batteries, transformers, etc.), relays, other switching devices and/or drive circuitry for driving the coil assembly 12, mechanical linkages, one or more sensors or data input devices (such as a sensor to detect movement and/or position of the diaphragms 2a, 2b and/or temperature of a device being cooled by a jet stream created by the fluid mover 4, user-operated buttons or switches, an interface to receive control instructions from another device, and so on), user data input devices (such as buttons, dials, knobs, a keyboard, a touch screen or other), information display devices (such as an LCD display, indicator lights, a printer, etc.), and/or other components for providing desired input/output and control functions. In short, the controller 14 may include any suitable components to perform desired control and communication functions for the fluid mover 4 or for other fluid movers such as liquid pumps, gas compressors or acoustic pumps and compressors.

In accordance with an aspect of the invention, the plug 23 may at least partially occlude or fill an opening of the coil 22, e.g., such that the plug 23 at least partially separates the first and second diaphragms from each other. (Note also that this aspect may be employed in an embodiment in which only one diaphragm is used in a fluid mover. Thus, for example, the plug 23 may separate a single diaphragm from other portions of the fluid mover 4 on an opposite side of the coil assembly 12, such as a part of the housing 1.) In this embodiment, the coil 22 is configured as an annular ring with an opening, which may have a circular, oval, elliptical or other closed-loop shape, and the plug 23 may have a shape that matches the size and shape of the opening of the annular ring. For example, the plug 23 may be made as a flat plate of steel having a thickness of about 0.030 inches that completely occludes or fills the coil opening, although other shapes and/or sizes are possible including those in which the plug 23 only partially fills the opening. A thickness of the plug 23 may be about the same as a thickness of the coil 22, e.g., so that an upper surface of the plug 23 is flush with an upper surface of the coil 22, and so a lower surface of the plug 23 is flush with a lower surface of the coil 22. In some arrangements, the upper and lower surfaces of the plug 23 and coil 22 may lie in a same plane, respectively, though this is not necessarily required, e.g., the plug 23 may protrude above and/or below the coil 22, or may be recessed. Thus, the coil 22 and plug 23 may define a flat, generally planar structure even though the upper and/or lower surfaces of the coil 22 and plug 23 are not precisely arranged in a common plane. This arrangement of the plug 23 may provide for improved flow characteristics in the gaps 25, 26, e.g., by the plug and coil defining a flat surface or other surface that has a low resistance to flow.

In accordance with another aspect of the invention, the support for the coil may be arranged around the coil so as to provide a separation wall or barrier between the diaphragms in addition to, or in the alternative to, a plug at a center opening of the coil. For example, as shown in FIG. 2, the coil 22 may be surrounded at its periphery by a support 21 which is immediately adjacent the coil 22 at the periphery of the coil 22. In the embodiment shown in FIG. 2, the support 21 is arranged as a flat plate with a hole at which the coil 22 is supported, and a thickness of the support 21 is approximately equal to a thickness of the coil 21. Thus, the support 21 and coil 22 (and possibly the plug 23) may define a flat, generally planar structure. In some arrangements, the support 21 may be arranged to define a flat surface with the coil and/or plug at upper and/or lower surfaces of the coil assembly 12, e.g., by having the support 21 arranged as a flat plate with upper and lower surfaces of the plate being flush or lying in a same plane as upper and lower surfaces of the coil 22 or plug 23. As noted above, the upper and lower surfaces of the support 21, coil 22 and/or plug 23 need not be precisely arranged in a common plane, but the support 21, coil 22 and/or plug 23 may still define a flat structure with flat surfaces on top and/or bottom. This flat structure arrangement for the coil assembly 12 may provide for a relatively compact coil assembly, and one that presents a low resistance to flow across the coil assembly 12. In addition, the flat nature of the coil assembly 12 may allow the diaphragm(s) 2 to be very closely positioned to the coil assembly 12, thereby increasing a force the magnetic field of the coil assembly 12 may exert on the diaphragm(s) 2.

As mentioned above, the coil assembly 12 is capable of moving the fluidic diaphragm(s) 2 via magnetic coupling, i.e., the coil assembly 12 is not mechanically linked to the diaphragm(s) 2 to cause their movement. As will be understood, current in windings of the coil 22 create a magnetic field to couple the coil assembly 12 and diaphragm(s) 2, and FIG. 2 shows a closed loop 50 that illustrates a path of the flux circuit that may be generated by a current in the coil 22. Actual flux lines would likely have a different, and varying shape than loop 50 depending on a variety of factors, such as the total amp-turns of the coil, magnetic permeability of materials around the coil 22, the dimensions of the individual components and so on.

In accordance with an aspect of the invention, the support 21 and/or plug 23 may have high relative magnetic permeability, e.g., a relative magnetic permeability greater than one, which may increase the magnetic forces of the coil's magnetic field on the diaphragm(s) 2. That is, generally speaking, an attractive magnetic force on the diaphragm(s) 2, created by the current in coil 22, may be increased by the addition of the high magnetic permeability support 21 and/or plug 23 since the support 21 and/or plug 23 may reduce the reluctance of the magnetic flux loop 50. For example, the support 21 and plug 23 may fill air spaces in a plane of the coil 22 with a high magnetic permeability material, thereby reducing a reluctance of the system. Therefore, the support 21 and/or plug 23 may eliminate or reduce any need to otherwise reduce the reluctance of flux loop 50 by having any portion of the diaphragm(s) 2 extend beyond a nearest surface of the coil 22, e.g., into the opening of the coil 22 or otherwise extend beyond a plane of the coil. That is, while other coil/diaphragm arrangements may require penetration of the diaphragm (or associated armature) beyond a plane of the closest coil surface (e.g., into the coil opening), the support 21 and/or plug 23 may avoid such a requirement, and yet provide improved force characteristics on the diaphragm(s) 2.

The diaphragm(s) 2 will generally include a magnetically permeable or magnetic material such that a magnetic field generated by the coil 22 will create a magnetic force causing movement of the diaphragm(s) 2. In this illustrative embodiment, the diaphragms 2 each include an armature 31 made as a circular, flat plate on a side of the diaphragm 2 adjacent the coil 22 such that the plate is opposed to the coil assembly 12. The armature 31 is made of a steel with high magnetic permeability and has a thickness of about 0.010 inches in this embodiment, but other arrangements are possible. The diaphragms 2 also include other components that are attached to, and move with, the armature 31 and pneumatically separate opposite sides of the diaphragm 2 from each other. For example, the diaphragm 2 may include one or more plates of spring steel that are attached at a periphery 33 of the diaphragm 2 to the housing 1. Thus, the periphery 33 of the diaphragm 2 may remain stationary relative to the housing 1 while inboard portions of the diaphragm 2 move under the influence of the coil assembly 12. In some embodiments, the one or more plates of spring steel may be concentric and separated from each other by a gap to enhance the pumping performance of the diaphragm 2, and the gap may be fluidically sealed by an over molding 32 such as an elastomer, for example. Over molding 32 may prevent fluid flow through the gap(s) between the diaphragm component parts and will also help join the diaphragm parts together. Of course, other diaphragm arrangements are possible, such as those described in WO2012/048179.

One feature that may be provided by a magnetically permeable plug 23 and/or by a magnetically permeable support 21 is that even though the addition of plug 23 and support 21 introduces 2 independently oscillating magnetic air gaps into the flux loop, this does not result in independent forces on the diaphragms and/or armatures and thus does not increase vibration of the housing. Consequently, the coil assembly 12 can maintain equal, or nearly equal, magnetic forces (though opposite) on the first and second diaphragms 2a, 2b. Equal forces will result in equal or nearly equal displacements of diaphragms 2a, 2b which will result in cancelation or near cancelation of the diaphragms inertial reaction forces on the housing 1. This may help maintain low vibration of the fluid mover 4 since the opposite and equal forces on the diaphragms 2a, 2b may be transmitted to, and canceled out by, the housing 1. Thus, vibration of the housing 1 may be minimized. Consequently, all the advantages of reduced chamber flow resistance and simplicity of design, provided by the coil assembly, can be realized without increasing housing vibration.

Figure 3:
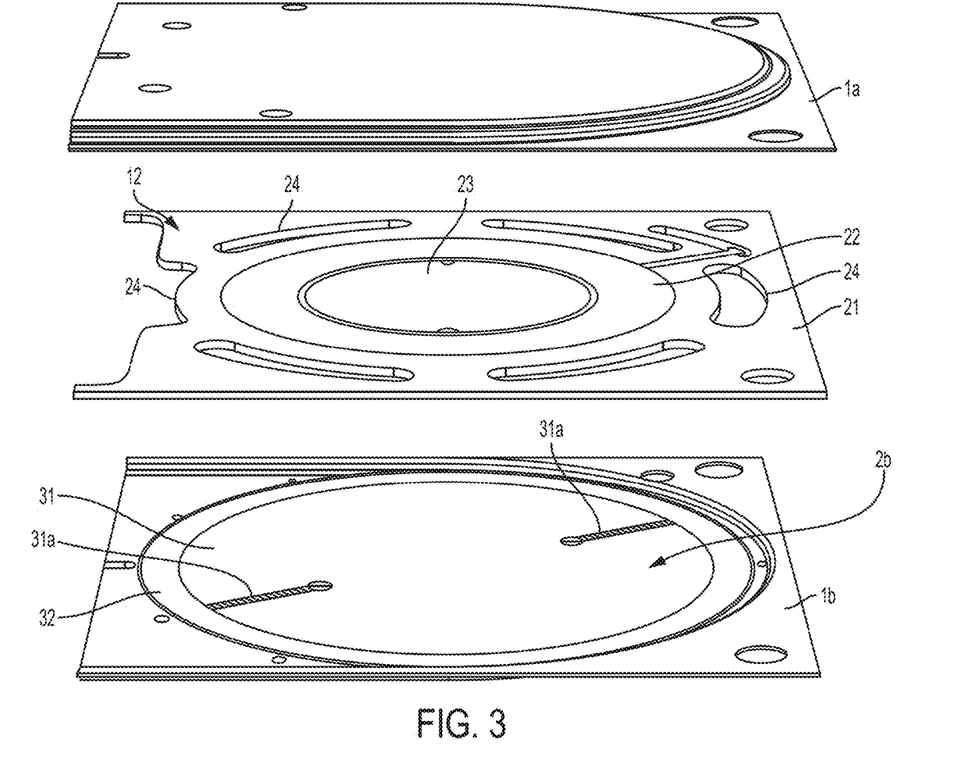
FIG. 3 shows an exploded view of the fluid mover of FIG. 1.

To further assist in helping to reduce vibration, the fluid mover 4 may be arranged to help maintain an equal pumping load on the diaphragms 2a, 2b. For example, the fluid mover 4 may be arranged so that the diaphragms 2a, 2b experience an equal resistance to movement by having nearly equal dynamic pressures in the gaps 25, 26. This may be accomplished by providing one or more openings or other fluid pathways that allow for fluidic communication between the spaces or gaps 25, 26 between each diaphragm 2a 2b and the coil assembly 12. For example, FIG. 3 shows an exploded diagram of the fluid mover 4 in which a first housing portion 1a (which has the first diaphragm 2a attached to it) is separated from a second housing portion 1b (which has the second diaphragm 2b attached to it). The coil assembly 12 is positioned between the first and second housing portions 1a, 1b, and the support 21, coil 22 and plug 23 are arranged together so as to define an at least somewhat fluid-tight structure between the gaps 25, 26. However, the support 21 includes openings 24 arranged around the coil 22 in an area that is radially outward from the armatures 31 (see FIG. 2 as well). These openings 24 provide for fluid communication between the first gap 25 between the first diaphragm 2a and the coil assembly 12, and the second gap 26 between the second diaphragm 2b and the coil assembly 12. As a result, pressures in the first and second gaps 25, 26 may be maintained nearly equal, thereby presenting the diaphragms 2a, 2b with a nearly equal load or resistance to movement.

FIG. 3 also shows that the support 21 is arranged so that the opening 24 near the outlet opening 8 (on the left in FIG. 3) allows the flows from the first and second gaps 25, 26 to merge together prior to interacting with the outlet nozzle or manifold 7. FIG. 3 also illustrates a keyhole-shaped recess 31a in the armature 31 of the second diaphragm 2b. This recess 31a provides physical clearance for control wires or leads to the coil 22, and may be eliminated if desired. The armature 31 of the first diaphragm 2a (not shown) may have similar keyhole recesses 31a, not necessarily to provide a space to route wiring, but rather to ensure that the armatures 31 have similar magnetic force response and masses.

Figure 4:
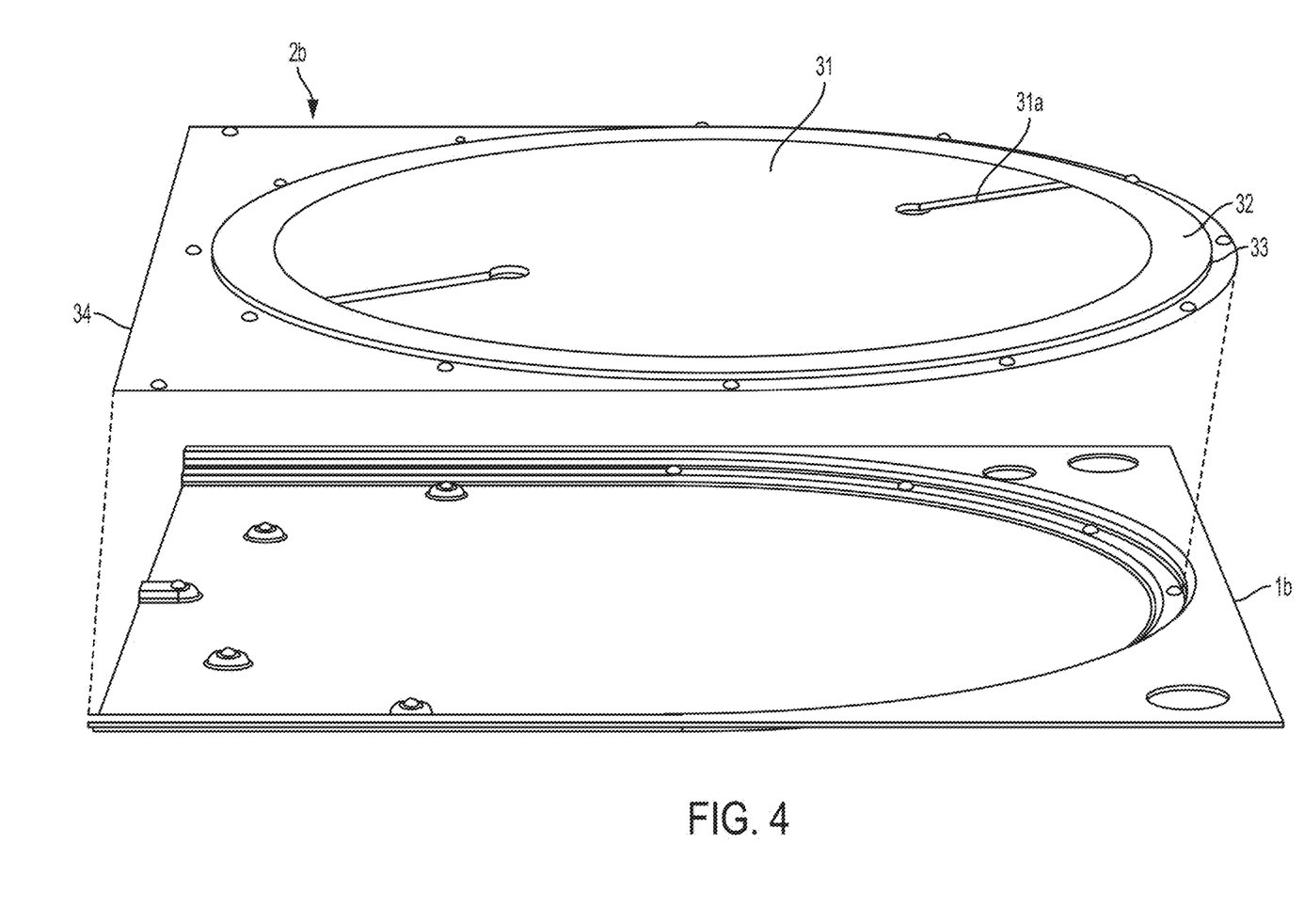
FIG. 4 shows an exploded view of a lower housing portion of the FIG. 1 embodiment.

FIG. 4 shows an exploded view of the second housing portion 1b and the second fluidic diaphragm 2b. The first housing portion 1a and the first fluidic diaphragm 2a are arranged in a similar way to that shown in FIG. 4, and so are not shown. In this embodiment, the second diaphragm 2b includes the armature 31 assembled to the other diaphragm components, which is attached to a diaphragm frame 34. The frame 34 provides support to the diaphragm 2b in the chamber 6, as well as affords attachment points for the diaphragm 2b to the second housing portion 1b and provides a separation wall or barrier between the second chamber portion 6c and the central chamber portion 6b (e.g., in an area near the outlet opening 8). The armature 31 in this embodiment is arranged to cover nearly all of the diaphragm area inside of the inner diameter of over molding 32, except for a flex region near the periphery 33. This flex region of the diaphragm 2 covered by over molding 32 is where a majority of bending of the diaphragm 2 occurs as more central portions of the diaphragm move under the influence of the magnetic forces. As noted above, this flex region may include hinge-like features, elastic components, or otherwise be arranged to provide desired flex characteristics for the diaphragm 2, such as a desired spring stiffness for a given mechanical resonant frequency, range of motion for the diaphragm central portion, etc.

Applications for the embodiments above can be found wherever energy is transferred to fluids by means of mechanical volumetric displacement. Applications include, for example, fluid movers such as pumps, compressors and synthetic jets; applying fluidic energy to fluid filled acoustic resonators for applications such as acoustic compressors or thermoacoustic engines, buzzers and as speaker cone elements in sound reproduction.

The embodiments provided herein are not intended to be exhaustive or to limit the invention to a precise form disclosed, and many modifications and variations are possible in light of the above teachings. The embodiments were chosen and described in order to best explain the principles of the invention and its practical application to thereby enable others skilled in the art to best utilize the invention in various embodiments and with various modifications as are suited to the particular use contemplated. Although the above description contains many specifications, these should not be construed as limitations on the scope of the invention, but rather as an exemplification of alternative embodiments thereof.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

The use of "including," "comprising," "having," "containing," "involving," and/or variations thereof herein, is meant to encompass the items listed thereafter and equivalents thereof as well as additional items.

It should also be understood that, unless clearly indicated to the contrary, in any methods claimed herein that include more than one step or act, the order of the steps or acts of the method is not necessarily limited to the order in which the steps or acts of the method are recited.

While aspects of the invention have been described with reference to various illustrative embodiments, such aspects are not limited to the embodiments described. Thus, it is evident that many alternatives, modifications, and variations of the embodiments described will be apparent to those skilled in the art. Accordingly, embodiments as set forth herein are intended to be illustrative, not limiting. Various changes may be made without departing from the spirit of aspects of the invention.

The invention claimed is:

1. A fluid mover comprising:
   a chamber having one or more outlet openings;
   a first fluidic diaphragm having a portion movable in the chamber to cause fluid to move at the one or more outlet openings;
   a second fluidic diaphragm having a portion movable in the chamber to cause fluid to move at the one or more outlet openings; and
   a coil assembly in the chamber that is positioned between the first fluidic diaphragm and the second fluidic diaphragm such that the first fluidic diaphragm is positioned over a top of the coil, and the second fluidic diaphragm is positioned under a bottom of the coil, the coil assembly being magnetically coupled to the first and second fluidic diaphragms to move the movable portions of the fluidic diaphragms toward the coil assembly and toward each other in response to a current in the coil assembly, the coil assembly including a coil with an opening, a plug in the opening, and a support around a periphery of the coil arranged to support the coil in the chamber, the support including a plate that defines a hole at which the coil is supported by the support,
   wherein the support, coil and plug define a first flat surface opposed to the first fluidic diaphragm, and the support, coil and plug define a second flat surface opposed to the second fluidic diaphragm, and
   wherein the plug includes a material with a relative magnetic permeability greater than one and the coil assembly is arranged such that magnetic field lines, created by a current in the coil to cause movement of the movable portions of the first and second fluidic diaphragms, pass through the plug and support.

2. The fluid mover of claim 1, wherein the support includes a material with a relative magnetic permeability greater than one.

3. The fluid mover of claim 1, wherein the first fluidic diaphragm and the coil assembly are arranged such that no portion of the first fluidic diaphragm enters the opening of the coil during movement of the movable portion of the first fluidic diaphragm.

4. The fluid mover of claim 1, wherein the plug completely occludes the opening.

5. The fluid mover of claim 1, wherein the support is immediately adjacent the periphery of the coil around the hole.

6. The fluid mover of claim 5, wherein the plug and the support each include a material with a relative magnetic permeability greater than one.

7. The fluid mover of claim 6, wherein the support, coil and plug define a flat structure.

8. The fluid mover of claim 6, wherein each of the first and second fluidic diaphragms includes an armature formed as a flat plate of material with a relative magnetic permeability greater than one.

9. The fluid mover of claim 1, wherein the plug and the support each include a material with a relative magnetic permeability greater than one.

10. The fluid mover of claim 9, wherein upper and lower gaps are present between the first fluidic diaphragm and the coil assembly, and between the second fluidic diaphragm and the coil assembly, respectively, and wherein the fluid mover is arranged to move fluid in the upper and lower gaps based on movement of the first and second fluidic diaphragms relative to the housing.

11. The fluid mover of claim 10, wherein the coil assembly is arranged to remain stationary relative to the chamber.

12. The fluid mover of claim 1, wherein the first and second fluidic diaphragms are arranged for vibratory movement in the chamber in which a portion of the fluidic diaphragm moves at a frequency of 0.1 Hz to 1kHz.

13. The fluid mover of claim 1, wherein the first and second fluidic diaphragms each have a periphery which is fixed relative to the chamber, and the coil assembly is arranged to move portions of the first and second fluidic diaphragms located inward of the periphery of the respective fluidic diaphragm relative to the chamber.

14. The fluid mover of claim 1, wherein the coil has an annular shape.

15. A fluid mover comprising:
    a chamber having one or more outlet openings;
    a first fluidic diaphragm having a portion movable in the chamber to cause fluid to move at the one or more outlet openings;
    a second fluidic diaphragm having a portion movable in the chamber to cause fluid to move at the one or more outlet openings; and
    a coil assembly in the chamber that is positioned between the first and second fluidic diaphragms and magnetically coupled to the first and second fluidic diaphragms to move the portions of the fluidic diaphragms toward each other and toward the coil assembly, the coil assembly including a coil having an opening, and a plug in the opening, and a support arranged to support the coil in the chamber such that the coil, the plug and the support define first and second flat surfaces opposed to the first and second fluidic diaphragms, respectively, the support formed as a flat plate having a hole in which the coil is positioned, and
    wherein an upper surface of the coil is located in a same plane as an upper surface of the support, and a lower surface of the coil is located in a same plane as a lower surface of the support.

16. The fluid mover of claim 15, wherein the upper surface of the coil is located in a same plane as an upper surface of the plug.

17. The fluid mover of claim 16, wherein a lower surface of the coil is located in a same plane as a lower surface of the plug.

18. The fluid mover of claim 15, wherein the first fluidic diaphragm is positioned over a top of the coil, and the second fluidic diaphragm is positioned under a bottom of the coil.

19. The fluid mover of claim 15 wherein upper and lower gaps are present between the first fluidic diaphragm and the coil assembly, and between the second fluidic diaphragm and the coil assembly, respectively, and wherein the fluid mover is arranged to move fluid in the upper and lower gaps based on movement of the first and second fluidic diaphragms relative to the housing.

20. The fluid mover of claim 15, wherein the coil assembly is arranged to remain stationary relative to the chamber.

21. The fluid mover of claim 15, wherein the first and second fluidic diaphragms each includes a flat diaphragm surface opposed to the coil assembly.

22. The fluid mover of claim 15, wherein the first and second fluidic diaphragms are arranged for vibratory movement in the chamber in which movable portions of the first and second fluidic diaphragms move at a frequency of 0.1 Hz to 1kHz.

23. The fluid mover of claim 15, wherein the first and second fluidic diaphragms each have a periphery which is fixed relative to the chamber, and the coil assembly is arranged to move portions of the first and second fluidic diaphragms located inward of the periphery relative to the chamber.

24. A fluid mover comprising:
- a chamber having one or more outlet openings;
- a first fluidic diaphragm having a portion movable in the chamber to cause fluid to move at the one or more outlet openings;
- a second fluidic diaphragm having a portion movable in the chamber to cause fluid to move at the one or more outlet openings; and
- a coil assembly in the chamber that is positioned between the first and second fluidic diaphragms and magnetically coupled to the first and second fluidic diaphragms to move the portions of the fluidic diaphragms toward each other and toward the coil assembly, the coil assembly including a coil having an opening, a plug in the opening, and a support arranged to support the coil in the chamber such that the coil, the plug and the support define first and second flat surfaces opposed to the first and second fluidic diaphragms, respectively,
- wherein an upper surface of the coil is located in a same plane as an upper surface of the plug, and a lower surface of the coil is located in a same plane as a lower surface of the plug.

* * * * *